(12) United States Patent
Sugiura (10) Patent No.: US 10,312,514 B2
(45) Date of Patent: Jun. 4, 2019

(54) POSITIVE ELECTRODE ACTIVE MATERIAL FOR LITHIUM SECONDARY BATTERY, POSITIVE ELECTRODE FOR LITHIUM SECONDARY BATTERY, AND LITHIUM SECONDARY BATTERY

(71) Applicant: TOYOTA JIDOSHA KABUSHIKI KAISHA, Toyota-shi, Aichi-ken (JP)

(72) Inventor: Ryuta Sugiura, Toyohashi (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 0 days.

(21) Appl. No.: 15/327,432

(22) PCT Filed: Jul. 22, 2015

(86) PCT No.: PCT/IB2015/001221
§ 371 (c)(1),
(2) Date: Jan. 19, 2017

(87) PCT Pub. No.: WO2016/012851
PCT Pub. Date: Jan. 28, 2016

(65) Prior Publication Data
US 2017/0141392 A1 May 18, 2017

(30) Foreign Application Priority Data

Jul. 22, 2014 (JP) .................................. 2014-149289
Jul. 21, 2015 (JP) .................................. 2015-143788

(51) Int. Cl.
*H01M 4/525* (2010.01)
*H01M 4/1315* (2010.01)
(Continued)

(52) U.S. Cl.
CPC .......... *H01M 4/525* (2013.01); *C01G 53/006* (2013.01); *C01G 53/54* (2013.01); *H01M 4/1315* (2013.01);
(Continued)

(58) Field of Classification Search
None
See application file for complete search history.

(56) References Cited

U.S. PATENT DOCUMENTS 6,337,158 B1 1/2002 Nakajima et al.
9,786,907 B2 * 10/2017 Sugiura ................ H01M 4/364
(Continued)

FOREIGN PATENT DOCUMENTS

CN 103107327 A 5/2013
CN 103682289 A 3/2014
(Continued)

OTHER PUBLICATIONS

Zhang et al. (CN 103332754) (a raw machine translation) (Abstract) (Oct. 2, 2013) (Year: 2013).*
(Continued)

*Primary Examiner* — Carmen V Lyles-Irving
(74) *Attorney, Agent, or Firm* — Sughrue Mion, PLLC (57) ABSTRACT

A positive electrode active material for a lithium secondary battery includes a lithium transition metal complex oxide that has a spinel crystalline structure. This lithium transition metal complex oxide includes: manganese and nickel as main transition metal elements; titanium and iron as additive transition metal elements; and oxygen and fluorine.

5 Claims, 1 Drawing Sheet

(51) Int. Cl.
*H01M 4/505* (2010.01)
*H01M 10/052* (2010.01)
*C01G 53/00* (2006.01)
*H01M 10/0525* (2010.01)
*H01M 4/13915* (2010.01)
*H01M 4/02* (2006.01)

(52) U.S. Cl.
CPC ......... *H01M 4/505* (2013.01); *H01M 10/052* (2013.01); *H01M 10/0525* (2013.01); *C01P 2002/32* (2013.01); *C01P 2004/61* (2013.01); *C01P 2006/40* (2013.01); *H01M 4/13915* (2013.01); *H01M 2004/028* (2013.01)

(56) References Cited

U.S. PATENT DOCUMENTS

| | | | |
|---|---|---|---|
| 2001/0024754 A1 | 9/2001 | Fukuzawa et al. | |
| 2003/0086863 A1 | 5/2003 | Noguchi et al. | |
| 2006/0057466 A1 | 3/2006 | Suhara et al. | |
| 2012/0315544 A1 | 12/2012 | Yasuda et al. | |
| 2013/0022815 A1* | 1/2013 | Oki | C01G 45/1207 428/402 |
| 2015/0089797 A1* | 4/2015 | Binder | C01G 45/1242 29/623.1 |
| 2016/0028074 A1 | 1/2016 | Sugiura | |

FOREIGN PATENT DOCUMENTS

| | | |
|---|---|---|
| DE | 102012102831 A1 | 10/2013 |
| JP | 2000149925 A | 5/2000 |
| JP | 2001250549 A | 9/2001 |
| JP | 2002184402 A | 6/2002 |
| JP | 2003-197194 A | 7/2003 |
| JP | 2006202678 A | 8/2006 |
| JP | 2010511990 A | 4/2010 |
| JP | 2012181975 A | 9/2012 |
| JP | 2013-143262 A | 7/2013 |
| JP | 2014130773 A | 7/2014 |
| WO | 2005028371 A1 | 3/2005 |
| WO | 2008069351 A1 | 6/2008 |
| WO | 2011111364 A1 | 9/2011 |
| WO | WO 2013149716 * 10/2013 ............. C01G 45/12 |  |

OTHER PUBLICATIONS

Zhang et al. (CN 103332754) (a raw machine translation) (Detailed Description) (Oct. 2, 2013) (Year: 2013).*

Zhang et al. (CN 103332754) (a raw machine translation) (Claims) (Oct. 2, 2013) (Year: 2013).*

Guodong Du et al.: "Fluorine-doped $LiNi_{0.5}Mn_{1.5}O_4$ for 5 V cathode materials of lithium-ion battery," Materials Research Bulletin, 2008, vol. 43, Issue 12, pp. 3607-3613.

Shin, H., et al., "Effect of Fluorine on the Electrochemical Properties of Layered $Li[Ni_{0.43}Co_{0.22}Mn_{0.35}]O_2$ Cathode Materials via a Carbonate Process", Electrochemical and Solid-State Letters, 8 (11), A559-563 (5 pages), 2005.

Park, S.-H., et al., "Lithium-manganese-nickel-oxide electrodes with integrated layered-spinel structures for lithium batteries", Electrochemistry Communications, vol. 9, 2007, pp. 262-268 (7 pages).

Wang, Z.Q., et al., "Polaron states and migration in F-doped $Li_2MnO_3$", Physics Letters A, vol. 378 (2014), pp. 2449-2452 (4 pages).

Notice of Allowance dated Jun. 7, 2017 from the United States Patent and Trademark Office in counterpart U.S. Appl. No. 14/805,756.

Communication dated Jan. 25, 2017 from the United States Patent and Trademark Office in counterpart U.S. Appl. No. 14/805,756.

* cited by examiner

POSITIVE ELECTRODE ACTIVE MATERIAL FOR LITHIUM SECONDARY BATTERY, POSITIVE ELECTRODE FOR LITHIUM SECONDARY BATTERY, AND LITHIUM SECONDARY BATTERY

This application is a National Stage of International Application No. PCT/IB2015/001221 filed Jul. 22, 2015, claiming priority based on Japanese Patent Application Nos. 2014-149289 filed Jul. 22, 2014 and 2015-143788 filed Jul. 21, 2015, the contents of all of which are incorporated herein by reference in their entirety.

BACKGROUND OF THE INVENTION

1. Field of the Invention

This invention relates to a positive electrode active material for lithium secondary batteries, to a positive electrode for lithium secondary batteries, and to a lithium secondary battery.

2. Description of Related Art

The requirement for ever higher energy densities is one aspect of improving the performance of lithium secondary batteries, which use the lithium ion as the charge carrier. The development of positive electrode active materials that have higher operating potentials than in the past (high-potential positive electrode active materials) has been pursued in order to respond to this requirement. An example of such a positive electrode active material are the nickel- and manganese-containing complex oxides that are lithium transition metal complex oxides with a spinel crystalline structure (also referred to in the following as "NiMn-system spinel-structured oxides") that exhibit an operating potential of at least 4.3 V versus lithium metal (more preferably an operating potential of at least 4.5 V). For example, an example of such a NiMn-system spinel-structured oxide is described in Japanese Patent No. 3,634,694 and Japanese Patent Application Publication No. 2003-197194 (JP 2003-197194 A). Japanese Patent Application Publication No. 2013-143262 (JP 2013-143262 A) describes a NiMn-system spinel-structured oxide for which the cycle life has been further improved by the substitution of Fe and Ti at a portion of the Mn sites in a NiMn-system spinel-structured oxide. In addition, a NiMn-system spinel-structured oxide is described in Materials Research Bulletin, 2008, Vol. 43, Issue 12, pp. 3607-3613 in which a portion of the oxygen (O) constituting the NiMn-system spinel-structured oxide has been replaced by fluorine (F).

However, the NiMn-system spinel-structured oxides have problems (objects) to be solved to use them effectively as high-potential positive electrode active materials for lithium secondary batteries. One of the objects is to improve the durability when the lithium secondary battery is used at high potentials. A capacity of a battery including the NiMn-system spinel-structured oxide as a high-potential positive electrode active material exhibits a tendency to decline in accordance with an increase of the number of high-potential charge/discharge cycles in which the battery is charged to a high potential, for example, at least 4.3 V versus lithium metal and discharged thereafter repeatedly. One cause of this is thought to be that the transition metal (for example, manganese) in a NiMn-system spinel-structured oxide readily undergoes elution in such a high-potential charged state. In addition, the nonaqueous electrolyte (typically a nonaqueous electrolyte solution) is decomposed in such a high-potential charged state with the new production of acid (for example, hydrogen fluoride (HF)). This acid promotes elution of the transition metal from the NiMn-system spinel-structured oxide. Moreover, the elimination of oxygen (O) readily occurs in a NiMn-system spinel-structured oxide in which a portion of the Mn sites have been substituted by Fe and Ti (i.e., the oxygen deficiency in such a NiMn-system spinel-structured oxide increases). As a result, the NiMn-system spinel-structured oxide exhibits a tendency for gas (for example, $H_2$) to be readily produced through the reductive decomposition of a portion of the nonaqueous electrolyte.

SUMMARY OF THE INVENTION

This invention provides a positive electrode active material for lithium secondary batteries, a positive electrode for lithium secondary batteries, and a lithium secondary battery.

A lithium secondary battery positive electrode active material that is a first aspect of the invention includes a lithium transition metal complex oxide that has a spinel crystalline structure. This lithium transition metal complex oxide includes manganese and nickel as main transition metal elements, titanium and iron as additive transition metal elements, and oxygen and fluorine.

The lithium secondary battery positive, electrode active material that is the first aspect of the invention can improve lithium secondary battery durability as follows. The lithium secondary battery durability is also referred to as the cycle characteristics in this Specification.

In the first aspect of the invention, the fluorine of the lithium transition metal complex oxide may be fluorine substituted for a portion of the oxygen of the lithium transition metal complex oxide.

In the above configuration, the lithium transition metal complex oxide (also referred to in the following as a NiMn-system spinel-structured oxide) contains Ni and Mn, which are the main transition metals constituting the spinel crystalline structure, and contains Ti and Fe substituted for a portion of the Ni and Mn. This Fe substitution and Ti substitution causes an increase in the bond force (bond energy) between the transition metal and oxygen in this NiMn-system spinel-structured oxide. This can therefore bring about an enhanced stability (durability) for this NiMn-system spinel-structured oxide for the state in which charging has been carried out to a high potential of 4.3 V or more versus lithium metal (also referred to below as a "high-potential state").

In a NiMn-system spinel-structured oxide containing no Ti or Fe, the oxidation state of the Mn in the spinel crystalline structure is generally at a stable 4+ under normal conditions. On the other hand, in a NiMn-system spinel-structured oxide in which a portion of the Ni and Mn has been substituted by Ti and Fe, the proportion of the Mn in an unstable 3+ oxidation state increases in a high-potential charge state because the average oxidation state of the Mn declines due to an adjustment of charge balance. Thus, the Mn readily elutes in the NiMn-system spinel-structured oxide in which a portion of the Ni and Mn has been substituted by Ti and Fe. In contrast to this, an amount of Mn elution can be decreased in the NiMn-system spinel-structured oxide in the first aspect of the invention even in a high-potential charge state, because the fluorine atom (F) has a high electronegativity (electron-withdrawing character) and bonds to the Mn at a high bond strength. In addition, the F substituted for the oxygen (O) can be introduced into oxygen deficiency sites of the NiMn-system spinel-structured oxide containing Ti and Fe, thereby compensating for the oxygen deficiency. As a result of that, the first aspect of the invention adjusts the charge balance of this NiMn-system spinel-structured oxide as a whole such as to increase the average oxidation state of the Mn, i.e., to decline the proportion for 3+ and increase the proportion for 4+. Thus, the first aspect of the invention efficiently decreases the amount of Mn elution and improves the stability (durability) of this NiMn-system spinel-structured oxide in the high-potential state. Moreover, since the amount of the oxygen deficiency in the NiMn-system spinel-structured oxide containing Ti and Fe is reduced, the production of gas, e.g., $H_2$, due to degradation of the nonaqueous electrolyte (typically a nonaqueous electrolyte solution) is reduced and the durability of the battery itself is raised and the ability to provide a long life is enhanced.

As indicated in the preceding, the first aspect of the invention improves a stability (durability) for the positive electrode active material (NiMn-system spinel-structured oxide) in a high-potential state. Thus, the first aspect of the invention can provide a positive electrode active material having a high reliability and excellent cycle characteristics.

The lithium transition metal complex oxide in the first aspect of the invention may be represented by the following general formula (I)

$$Li_xMn_{2-a-b-c-d}Ni_aTi_bFe_cM_dO_{4-y}F_y \quad (I)$$

M is at least one element selected from the group consisting of Al, Si, Mg, Ca, Ba, Sr, Sc, V, Cr, Co, Cu, Zn, Ga, Y, Ru, Rh, Pd, In, Sn, Sb, La, Ce, Sm, Zr, Nb, Ta, Mo, W, B, C, P, and S. Formula (I) also satisfies the following conditions: $0.9 \leq x \leq 1.3$, $0.0005 \leq y \leq 0.1$, $0.4 \leq a \leq 0.6$, $0 < b \leq 0.2$, $0 < c \leq 0.2$, and $0 \leq d \leq 0.2$. According to the first aspect of the invention, it is possible to provide a positive electrode active material that stably maintains the spinel crystalline structure and avoids Mn elution and thus has a high durability.

The general formula (I) in the above-described construction also may satisfy the following conditions: $d=0$; $0.05 \leq y \leq 0.1$; $0 < b \leq 0.1$; and $0 < c \leq 0.1$. That is, it may be represented by general formula (II)

$$Li_xMn_{2-a-b-c}Ni_aTi_bFe_cO_{4-y}F_y \quad (II)$$

The general formula (II) may satisfy the following: $0.9 \leq x \leq 1.3$, $0.05 \leq y \leq 0.1$, $0.4 \leq a \leq 0.6$, $0 < b \leq 0.1$, and $0 < c \leq 0.1$. With a NiMn-system spinel-structured oxide with this structure, the spinel crystalline structure is even more stably maintained and the introduced F efficiently enters into oxygen deficiency sites. The oxygen deficiency is substantially lowered as a result. As a consequence, Mn elution is effectively prevented and a highly durable positive electrode active material can then be provided. Moreover, the amount of gas production can be decreased still further even when the lithium secondary battery is used in a high-potential state.

A lithium secondary battery positive electrode that is a second aspect of the invention includes a positive electrode current collector and a positive electrode active material layer. This positive electrode active material layer is disposed on the positive electrode current collector and contains the lithium secondary battery positive electrode active material according to the first aspect of the invention.

A lithium secondary battery that is a third aspect of the invention includes a positive electrode, a negative electrode, and a nonaqueous electrolyte. This positive electrode includes a positive electrode active material layer on a positive electrode current collector. The negative electrode includes a negative electrode active material layer on a negative electrode current collector. This positive electrode active material layer contains the lithium secondary battery positive electrode active material of the first aspect of the invention.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Preferred embodiments of the invention are described in the following. Matters required for the execution of the invention but not particularly described in this Specification may be executed as appropriate based on the related art in the pertinent field.

The lithium secondary battery positive electrode in the embodiments of the invention includes a positive electrode current collector and a positive electrode active material layer formed on this positive electrode current collector. The same conductive members composed of a highly conductive metal as the current collectors used for the positive electrodes of lithium secondary batteries in the related art are preferably used for this positive electrode current collector. For example, aluminum or an alloy in which aluminum is the major component can be used. The shape of the positive electrode current collector can differ in conformity to, for example, the shape of the lithium secondary battery and as a result is not particularly limited and various configurations, e.g., rod shape, plate shape, sheet shape, foil, and so forth, can be assumed.

The positive electrode active material of the embodiments of the invention can be favorably used as a positive electrode active material for use in lithium secondary batteries. This positive electrode active material for use in lithium secondary batteries is a positive electrode active material constituted of a lithium transition metal complex oxide having a spinel crystalline structure. This lithium transition metal complex oxide having a spinel crystalline structure is a NiMn-system spinel-structured oxide that includes manganese (Mn) and nickel (Ni) as its main transition metals and that includes at least titanium (Ti) and iron (Fe) as additive transition metals. The Fe and Ti are substituted for a portion of the Ni and Mn (typically a portion of the Mn sites) that are the main transition metals in the NiMn-system spinel-structured oxide. This Fe substitution and Ti substitution increases the bond force between the oxygen and transition metal present in the NiMn-system spinel-structured oxide. The stability (durability) of the NiMn-system spinel-structured oxide is thereby enhanced.

The NiMn-system spinel-structured oxide in the embodiments of the invention contains fluorine (F) in addition to oxygen (O) wherein a portion of the oxygen (O) constituting the oxide is substituted by the fluorine (F). The fluorine is typically substituted at a portion of the sites where oxygen is coordinated (i.e., O sites) in the crystalline structure of this NiMn-system spinel-structured oxide. The F present in the NiMn-system spinel-structured oxide has a high electronegativity (electron-withdrawing character) and can bond with the Mn at a high bond strength.

As a consequence, the Mn can be prevented from eluting from the NiMn-system spinel-structured oxide even in a high-potential charge state, for example, where the potential for the positive electrode is at least 4.3 V (typically at least 4.5 V) versus lithium metal.

Oxygen deficiency sites can also be generated in a NiMn-system spinel-structured oxide containing Ti and Fe. In the embodiments of the invention, the F that has substituted for a portion of the oxygen (O) in the NiMn-system spinel-structured oxide can compensate for these oxygen deficiency sites. In accordance with this deficiency compensation for the oxygen deficiency sites by the F, the average charge on the Mn is increased such that charge balance for the NiMn-system spinel-structured oxide is adjusted as a whole. This results in an increase in the percentage occurrence of Mn in the 4+ oxidation state, which under normal conditions is stable and resistant to elution from the NiMn-system spinel-structured oxide into the nonaqueous electrolyte. This can improve the inhibitory effect on Mn elution from the NiMn-system spinel-structured oxide in the aforementioned high-potential charge state. Moreover, this deficiency compensation by F for the oxygen deficiency sites can decrease gas (for example, $H_2$ gas) generated due to nonaqueous electrolyte decomposition, for which the oxygen deficiency sites are active sites. That is, Ti and Fe are substituted for a portion of the Mn and Ni main transition metals constituting the NiMn-system spinel-structured oxide, and fluorine (F) is substituted for a portion of the oxygen (O) constituting this oxide, thereby generating a synergetic effect between the stability(durability)-improving effect on the spinel crystalline structure due to the Ti/Fe substitution, the stability (durability)-improving effect on the spinel crystalline structure due to the F substitution, and the gas production-lowering effect due to the F substitution. As compared to a NiMn-system spinel-structured oxide in which only Ti/Fe substitution has been carried out and a NiMn-system spinel-structured oxide in which only F substitution has been carried out, the NiMn-system spinel-structured oxide according to the embodiments of the invention has a more stable spinel crystalline structure, i.e., has a higher durability, and can provide a more substantial lowering of the gas produced in association with nonaqueous electrolyte decomposition.

The average composition of the aforementioned NiMn-system spinel-structured oxide is preferably represented by the following general formula (I).

$$Li_xMn_{2-a-b-c-d}Ni_aTi_bFe_cM_dO_{4-y}F_y \qquad (I)$$

Here, the M in formula (I) is either not present or can be an additive element other than Li, Mn, Ni, Ti, Fe, O, or F. Formula (I) also satisfies the following conditions: $0.9 \leq x \leq 1.3$, $0.0005 \leq y \leq 0.1$, $0.4 \leq a \leq 0.6$, $0 < b \leq 0.2$, $0 < c \leq 0.2$, and $0 \leq d \leq 0.2$. In addition, while the values of x, y, a, b, c, and d can vary with the proportions among the elements, they are set within ranges in which a compound with formula (I) can assume a spinel structure.

The x in formula (I) gives the Li content in the NiMn-system spinel-structured oxide. This x is preferably determined so the condition of charge neutrality is satisfied. It may typically be $x = 1 \pm 0.05$ and is more preferably $x = 1$.

The a in formula (I) gives the Ni content ratio in the NiMn-system spinel-structured oxide. An improvement in the cycle characteristics and an improvement in the energy density can be achieved by the substitution of Ni at a portion of the Mn sites in the NiMn-system spinel-structured oxide. Accordingly, viewed in terms of the expression of the effects of this Ni substitution at a high level, $0.42 \leq a$ is more preferred. Viewed in terms of the stable retention of a stable spinel structure, $a \leq 0.5$ is more preferred. Typically $a = 0.45$ can be used.

The b in formula (I) gives the Ti content ratio in the NiMn-system spinel-structured oxide. The c in formula (I) represents the Fe content ratio in the NiMn-system spinel-structured oxide. When the Ti content ratio for the NiMn-system spinel-structured oxide is too large (typically when b in formula (I) is so much larger than 0.2), the electronic conductivity of the positive electrode active material declines and the risk arises of an increase in the battery resistance for a lithium secondary battery in which the operating upper limit potential for the positive electrode is equal to or greater than 4.5 V versus lithium metal. Accordingly, viewed from the standpoint of suppressing the increase in the battery resistance while generating a strong Mn elution-inhibiting effect due to the substitution of Ti and Fe for a portion of the Ni and Mn in the NiMn-system spinel-structured oxide, b is preferably $0 < b \leq 0.15$ (more preferably $0 < b \leq 0.1$ and even more preferably $0.01 \leq b \leq 0.1$).

In addition, when the Fe content ratio in the NiMn-system spinel-structured oxide is too large (typically when c in formula (I) is so much larger than 0.2), there is a risk of a decline in the stably operating battery capacity at an operating upper limit potential for the positive electrode from 4.5 V to 5 V versus lithium metal. Accordingly, viewed from the standpoint of suppressing the decline in the battery capacity while generating a strong Mn elution-inhibiting effect due to the substitution of Ti and Fe for a portion of the Ni and Mn in the NiMn-system spinel-structured oxide, c is preferably $0 < c \leq 0.15$ (more preferably $0 < c \leq 0.1$ and even more preferably $0.01 \leq c \leq 0.1$).

The y in formula (I) gives the F content ratio (the proportion of substitution of the O in the NiMn-system spinel-structured oxide by F) for the NiMn-system spinel-structured oxide. Within the above-indicated range of $0.0005 \leq y \leq 0.1$, the Mn elution-inhibiting effect and the effect of lowering the amount of gas production assume an increasing trend as the F content ratio in the NiMn-system spinel-structured oxide increases. It is difficult, on the other hand, to stably maintain the spinel crystalline structure when the F content ratio in the NiMn-system spinel-structured oxide (the proportion of substitution of the O in the NiMn-system spinel-structured oxide by F) is too large (typically when y in formula (I) is larger than 0.1). As a consequence, considered from the standpoint of stably maintaining the spinel crystalline structure while generating a strong Mn elution-inhibiting effect and a strong gas production-suppressing effect based on the presence of fluorine in addition to oxygen in the NiMn-system spinel-structured oxide, i.e., based on the substitution of F for a portion of the O constituting the NiMn-system spinel-structured oxide, y is preferably $0.001 \leq y \leq 0.1$ (more preferably $0.05 \leq y \leq 0.1$).

The M in formula (I) is either not present or can be one element or two or more elements selected from alkaline-earth metal elements such as magnesium (Mg), calcium (Ca), strontium (Sr), and barium (Ba); transition metal elements such as scandium (Sc), vanadium (V), chromium (Cr), cobalt (Co), copper (Cu), zinc (Zn), yttrium (Y), zirconium (Zr), niobium (Nb), molybdenum (Mo), ruthenium (Ru), rhodium (Rh), palladium (Pd), tantalum (Ta), and tungsten (W); lanthanoid elements such as lanthanum (La), cerium (Ce), and samarium (Sm); non-transition metal elements such as aluminum (Al), gallium (Ga), indium (In), and tin (Sn); semi-metal elements such as boron (B), silicon (Si), and antimony (Sb); and nonmetal elements such as carbon (C), phosphorus (P), and sulfur (S). That is, the NiMn-system spinel-structured oxide can be either an oxide for which the constituent metal elements are only Li, Mn, Ni, Ti, and Fe or an oxide that contains one or two or more additive elements (M) in addition to these constituent metal elements (Li, Mn, Ni, Ti, and Fe). The herein disclosed NiMn-system spinel-structured oxide may either not contain M or, with the goal of improving the battery properties (for example, increasing the energy density, enhancing the durability (cycle characteristics), enhancing the input/output characteristics, and so forth), may contain one or two or more elements selected from the elements listed above as M.

Typically the M in formula (I) is either not present or can be one element or two or more elements selected from the group consisting of aluminum (Al), silicon (Si), magnesium (Mg), calcium (Ca), barium (Ba), strontium (Sr), scandium (Sc), vanadium (V), chromium (Cr), cobalt (Co), copper (Cu), zinc (Zn), gallium (Ga), yttrium (Y), ruthenium (Ru), rhodium (Rh), palladium (Pd), indium (In), tin (Sn), antimony (Sb), lanthanum (La), cerium (Ce), samarium (Sm), zirconium (Zr), niobium (Nb), tantalum (Ta), molybdenum (Mo), tungsten (W), boron (B), carbon (C), phosphorus (P), and sulfur (S). In particular, silicon (Si), cobalt (Co), lanthanum (La), zirconium (Zr), niobium (Nb), tantalum (Ta), tungsten (W), and boron (b) are elements preferred for inclusion as M.

The NiMn-system spinel-structured oxide under consideration is more preferably represented by the following general formula (II).

$$Li_xMn_{2-a-b-c}Ni_aTi_bFe_cO_{4-y}F_y \qquad (II)$$

Here, formula (II) satisfies the following: $0.9 \leq x \leq 1.3$, $0.05 \leq y \leq 0.1$, $0.4 \leq a \leq 0.6$, $0 < b \leq 0.1$, and $0 < c \leq 0.1$. This NiMn-system spinel-structured oxide in particular exhibits a high stability for the spinel crystalline structure and, due to the F, a high deficiency-compensating effect (i.e., an oxygen deficiency-lowering effect) for the oxygen deficiency sites. As a consequence, this NiMn-system spinel-structured oxide can be favorably used as a positive electrode active material that exhibits an excellent Mn elution-inhibiting effect in a high-potential charge state (typically when the potential for the positive electrode is 4.3 V or higher versus lithium metal) and that exhibits a suppression of gas generation.

The NiMn-system spinel-structured oxide represented by formula (I) or formula (II) preferably satisfies $x=1$, $0.05 \leq y \leq 0.1$, $a=0.45$, $b=0.05$, $c=0.05$, and $d=0$. That is, the NiMn-system spinel-structured oxide may be represented by $LiMn_{1.45}Ni_{0.45}Ti_{0.05}Fe_{0.05}O_{4-y}F_y$. This $LiMn_{1.45}Ni_{0.45}Ti_{0.05}Fe_{0.05}O_{4-y}F_y$ exhibits a high stability by the spinel crystalline structure and, due to the F, a high deficiency-compensating effect (i.e., an oxygen deficiency-lowering effect) for the oxygen deficiency sites.

The composition of the elements constituting the NiMn-system spinel-structured oxide can be checked (measured) by inductively coupled plasma-atomic emission spectrometry (ICP-AES) or lanthanum-alizarin complexone absorptiometry in accordance with the related art.

The $O_{4-y}$ in general formulas (I) and (II) can be more rigorously specified by $O_{4-y-\delta}$. Here, δ represents the oxygen deficiency in the spinel crystalline structure under consideration, and its precise indication is problematic because it can vary as a function of the type of substitutional atoms and the substitution proportions for this crystalline structure, the environmental conditions, and so forth. As a consequence, δ, which is a variable that determines the number of oxygen atoms, is typically either zero or a positive number not greater than 1, and, for example, $0 \leq \delta \leq 1$ can be used. On the other hand, the NiMn-system spinel-structured oxide of the embodiments of the invention contains fluorine in addition to oxygen, i.e., contains F substituted for a portion of the O that constitutes the NiMn-system spinel-structured oxide. Accordingly, while the embodiments of the invention, such as general formulas (I) and (II), are described omitting δ for the sake of convenience, this is not meant to indicate that $O_{4-y}$ is different from $O_{4-y-\delta}$. That is, the $O_{4-y}$ in general formulas (I) and (II) may also be indicated with $O_{4-y-\delta}$.

A method for producing a positive electrode active material that contains the above-described NiMn-system spinel-structured oxide is described in the following. The production method of the embodiments of the invention contains a step of preparing a precursor for the NiMn-system spinel-structured oxide and a firing step.

In the precursor preparation step, a precursor represented by general formula (III) is prepared by adding, with stirring, an aqueous basic solution with a pH of about 11 to 14 to an aqueous solution that contains salts that individually contain the elements that constitute the NiMn-system spinel-structured oxide target (or salts that contain two or more of these constituent elements) other than lithium, oxygen, and fluorine, for example, the various constituent elements—other than lithium, oxygen, and fluorine—in formula (I) or formula (II), and carrying out a liquid phase reaction in this aqueous solution.

$$Mn_{2-a-b-c-d}Ni_aTi_bFe_cM_d(OH)_{4+m} \qquad (III)$$

Here, m is zero or a positive number that is not greater than 1 and typically is $0 \leq m \leq 0.5$. The definitions of a, b, c, d, and M are the same as for formula (I) or formula (II). The aqueous basic solution can be an aqueous solution of either a strong base (for example, an alkali metal hydroxide) or a weak base (for example, ammonia) or a mixed aqueous solution of a strong base and a weak base. This mixed aqueous solution is preferably a mixed aqueous solution that maintains a pH of about 11 to 14 at a liquid temperature of 25 C and that does not interfere with the production of the precursor. For example, a mixed solution of an aqueous sodium hydroxide solution and aqueous ammonia may be used.

For example, the aqueous solution in this precursor preparation step can be prepared by dissolving a desired nickel salt, manganese salt, titanium salt, iron salt, and so forth in a prescribed quantity for each in an aqueous solvent. The order of addition of these salts to the aqueous solvent is not particularly limited. Preparation may also be carried out by mixing individual aqueous salt solutions. The anion in these metal salts (e.g., the nickel salt, manganese salt, and so forth) may be selected to provide a desired water solubility for each of these salts. Examples are the sulfate ion, nitrate ion, chloride ion, and carbonate ion. That is, these metal salts can each be, for example, the sulfate salt, nitrate salt, hydrochloride salt, carbonate salt, and so forth, of nickel, manganese, and so forth. The anions in these metal salts may all be the same or some may be the same or they may differ from one another. For example, the combination of a sulfate salt of nickel and a carbonate salt of manganese can be used. These salts may each be solvates, for example, hydrates. There are no particular limitations on the order of addition of these metal salts.

A pre-firing starting material for producing the target NiMn-system spinel-structured oxide is obtained by adding a lithium salt that is the lithium source and a fluorine compound that is the fluorine source to this precursor and mixing. A NiMn-system spinel-structured oxide with the desired composition can be obtained by adjusting the type and amount of addition of the added lithium salt and fluorine compound.

The F can be introduced into the NiMn-system spinel-structured oxide (i.e., the F can be substituted for a portion of the O in the NiMn-system spinel-structured oxide) by admixing a fluorine compound with the starting compound (the precursor described above) and firing. For example, lithium fluoride, ammonium fluoride, and so forth can be favorably used as this fluorine compound. Lithium fluoride is particularly preferred because it can also function as the lithium salt. A single fluorine compound can be used by itself or a combination of two or more fluorine compounds can be used. In addition, the aforementioned lithium fluoride or a common lithium salt as used to form lithium complex oxides in the related art can be used without particular limitation as the lithium salt under consideration. These common lithium salts can be specifically exemplified by lithium carbonate, lithium hydroxide, and so forth. A single one of these lithium salts may be used by itself or two or more may be used in combination.

The amounts of addition of the fluorine compound (typically lithium fluoride) and the lithium salt (for example, lithium carbonate, lithium hydroxide, lithium fluoride, and so forth) can be established such that the composition of the elements that will constitute the positive electrode active material to be synthesized (the NiMn-system spinel-structured oxide) provides the target composition ratios, for example, provides the ranges represented for formula (I) or formula (II). For example, when the total amount of the transition metal in the aforementioned precursor is 2 mol, the amount of addition of the lithium salt (for example, lithium carbonate, lithium hydroxide, lithium fluoride, and so forth) can be set so the Li assumes a proportion of about 1.0 mol (typically about 1.0 to 1.3 mol). In addition, when the total amount of the transition metal in the precursor is 2 mol, for example, the amount of addition for the fluorine compound used can be set so the F assumes a proportion of from about at least 0.001 mol (typically at least 0.01 mol, for example, at least 0.02 mol) to not more than 1.0 mol (typically not more than 0.8 mol, for example, not more than 0.5 mol, and preferably not more than 0.3 mol).

The pre-firing starting material is fired in the firing step to thereby synthesize a positive electrode active material containing the desired NiMn-system spinel-structured oxide. The firing temperature is preferably in the range from approximately 700 to 1000° C. This firing may be carried out at one time at the same temperature or may be carried out in stages at different temperatures. The firing time can be selected as appropriate. For example, firing may be carried out for approximately 2 to 24 hours at approximately 800 to 1000° C. or firing may be carried out for approximately 1 to 12 hours at approximately 700 to 800° C. followed by firing for approximately 2 to 24 hours at approximately 800 to 1000° C.

Alternatively, a NiMn-system spinel-structured oxide may be synthesized by firing a mixture of the precursor with a lithium salt, but without adding a fluorine compound to the firing step, and introducing F (i.e., substituting F for a portion of the O in the NiMn-system spinel-structured oxide) into this NiMn-system spinel-structured oxide by a procedure in which this NiMn-system spinel-structured oxide is additionally exposed to a fluorine gas atmosphere.

After firing, a positive electrode active material having the desired characteristics (for example, average particle diameter) can be obtained by the execution of a suitable treatment, for example, a pulverization treatment (for example, a pulverization treatment with a ball mill) and/or a sieving treatment. While not being a particular limitation, a powder substantially constituted of secondary particles having a cumulative 50% particle diameter (median diameter: D50) in the range from 1 μm to 25 μm (typically 2 μm to 20 μm, for example, 5 μm to 15 μm) in the volume-based particle diameter distribution obtained with an ordinary laser diffraction particle distribution analyzer is preferably used as the positive electrode active material. In the following, unless specifically described otherwise, the "average particle diameter of the positive electrode active material" refers to the median diameter (the particle diameter corresponding to a cumulative 50% from the fine particle side, or D50, in the volume-based particle size distribution measured by a particle diameter distribution measurement based on an ordinary laser diffraction • scattering method) of the secondary particles of the positive electrode active material.

In addition to the indicated positive electrode active material, the positive electrode active material layer can contain any of various components, e.g., a conductive material, a binder, and so forth, on an optional basis. A carbon material, e.g., carbon black (for example, acetylene black or Ketjenblack) can be used as the conductive material. Various polymers, e.g., polyvinylidene fluoride (PVDF), polyethylene oxide (PEO), and so forth, can be used as the binder.

The negative electrode in the lithium secondary battery according to the embodiments of the invention includes a negative electrode current collector and a negative electrode active material layer formed on this negative electrode current collector. This negative electrode active material layer typically contains, for example, a negative electrode active material, a binder, and a thickener. A conductive material composed of a metal having an excellent conductivity (for example, copper) can be advantageously used as the negative electrode current collector. A carbon material, e.g., graphite, a graphitization-resistant carbon (hard carbon), an easily graphitizable carbon (soft carbon), and so forth, can be used as the negative electrode active material. Graphite is preferably used among the preceding. Various polymers, e.g., styrene-butadiene rubber (SBR) and so forth, can be used as the binder. Various polymers, e.g., carboxymethyl cellulose (CMC) and so forth, can be used as the thickener.

A preferred implementation of a lithium secondary battery is described in the following with reference to the figures. There are no particular limitations on the shape (outer shape and size) of the lithium secondary battery. The embodiments are described in the following using as an example a lithium secondary battery having a structure in which a wound electrode assembly and an electrolyte solution are housed in a rectangular battery case. In the following figures, members and positions that have the same function are assigned the same reference number and duplicate explanations thereof have been omitted. In addition, the dimensional relationships (length, width, thickness, and so forth) in each figure do not necessarily reflect actual dimensional relationships.

Figure 1:
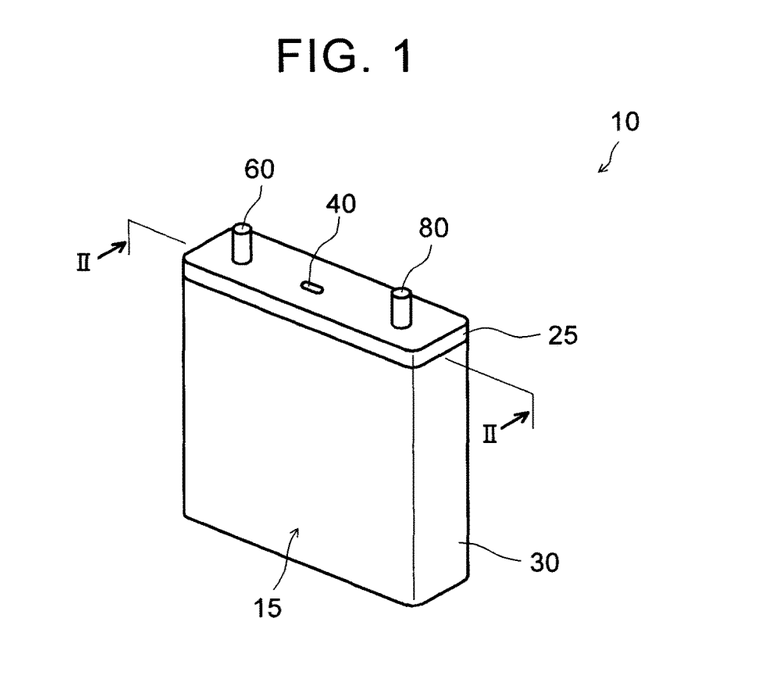
FIG. 1 is a perspective diagram that schematically shows the outer shape of a lithium secondary battery according to an embodiment of the invention.
Figure 2:
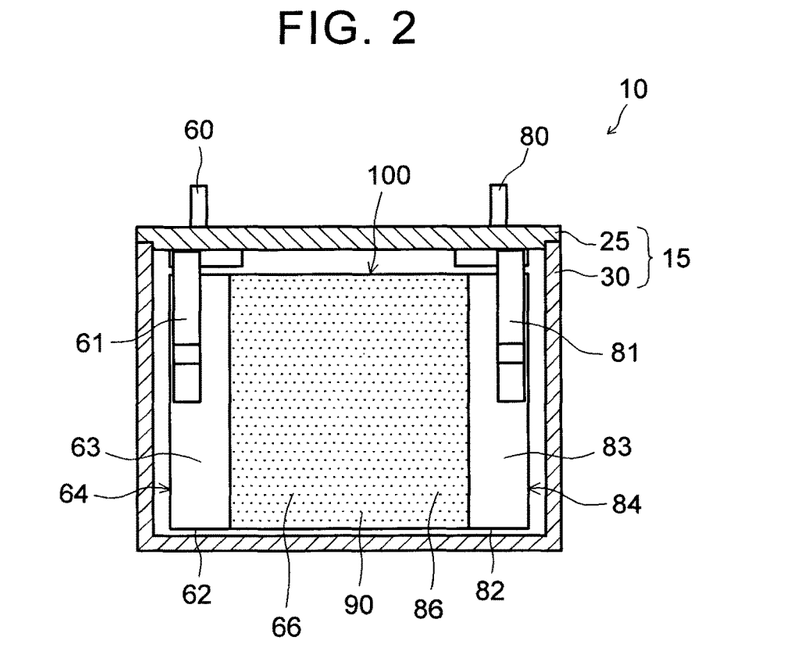
FIG. 2 is a cross-sectional diagram along the line in FIG. 1.

As shown in FIGS. 1 and 2, the lithium secondary battery 10 of this embodiment is provided with a battery case 15. The battery case 15 in this embodiment is a metal battery case (for example, of aluminum) and is provided with a flat, box-shaped (typically a rectangular parallelepiped) case main body (outer case) 30 that has a bottom and is open at the upper end, and with a lid 25 that closes the opening in the case main body 30. A positive electrode terminal 60, which electrically connects to a positive electrode sheet 64 of a wound electrode assembly 100, and a negative electrode terminal 80, which electrically connects to a negative electrode sheet 84 of the wound electrode assembly 100, are disposed in the upper surface (that is, the lid 25) of the battery case 15. Also formed in the lid 25 is a fill port (not shown) for filling the nonaqueous electrolyte solution, vide infra, into the case main body 30 (the battery case 15) that houses the wound electrode assembly 100. This fill port is sealed by a sealing plug after the nonaqueous electrolyte solution has been introduced. In the same manner as for the case of a lithium secondary battery according to the related art, a safety valve 40 is disposed in the lid 25 in order to discharge, from the battery case 15, gas produced within the battery case 15 during abnormal battery operation. The wound electrode assembly 100 is housed within the case main body 30 in a configuration in which the winding axis of the wound electrode assembly 100 is placed sideways (that is, the opening is formed in the direction normal to the winding axis of the wound electrode assembly 100). After this, the lithium secondary battery (nonaqueous electrolyte secondary battery) 10 is fabricated by sealing the opening in the case main body 30 with the lid 25. The lid 25 and the case main body 30 are joined together by, for example, welding.

The wound electrode assembly 100 is fabricated by stacking a long positive electrode sheet 64 with a long negative electrode sheet 84 with a total of two long separator sheets 90 interposed therebetween and winding this assembly in the long direction. When this stacking is performed, the positive electrode sheet 64 and the negative electrode sheet 84 are stacked slightly offset in the width direction so a positive electrode active material layer-free region 63 on the positive electrode sheet 64 and a negative electrode active material layer-free region 83 on the negative electrode sheet 84 respectively protrude from the two sides in the width direction of the separator sheets 90. The positive electrode active material layer-free region 63 serves as a region where the positive electrode mixture layer 66 is not formed and the positive electrode current collector 62 is exposed. In addition, the negative electrode active material layer-free region 83 serves as a region where the negative electrode mixture layer 86 is not formed and the negative electrode current collector 82 is exposed. As a result, the positive electrode sheet 64, the negative electrode sheet 84, and the separator sheets 90 are stacked with each other in the center of the wound electrode assembly 100 considered in the direction of the winding axis and a wound stacked region is thereby formed.

As shown in FIG. 2, the positive electrode terminal 60 (for example, of aluminum) is joined through a positive electrode current collector tab 61 to the positive electrode active material layer-free region 63 of the wound electrode assembly 100 to electrically connect the positive electrode terminal 60 to the positive electrode sheet 64 of the wound electrode assembly 100. Similarly, the negative electrode terminal 80 (for example, of nickel) is joined through a negative electrode current collector tab 81 to the negative electrode active material layer-free region 83 to electrically connect the negative electrode terminal 80 to the negative electrode sheet 84. The positive and negative electrode terminals 60, 80 may be joined, respectively, to the positive and negative electrode active material layer-free regions 63, 83 (typically the positive electrode current collector 62 and the negative electrode current collector 82) by, for example, ultrasound welding or resistance welding.

The separators according to the related art can be used without particular limitation as the separator in the embodiments of the invention. For example, the use is preferred of a porous resin sheet (microporous resin sheet). A porous polyolefin resin sheet of, e.g., polyethylene (PE), polypropylene (PP), and so forth, is preferred. The following, for example, can be advantageously used: a PE monolayer sheet, a PP monolayer sheet, a sheet with a two-layer structure in which a PE layer is laminated with a PP layer (PE/PP structure), and a sheet with a three-layer structure in which a PP layer is laminated on both sides of a PE layer (PP/PE/PP structure).

A nonaqueous electrolyte provided by incorporating a supporting salt in an organic solvent (nonaqueous solvent) is typically used as the nonaqueous electrolyte in the embodiments of the invention. A lithium salt, sodium salt, and so forth can be used as the supporting salt, whereamong lithium salts such as $LiPF_6$ and $LiBF_4$ are advantageously used. An aprotic solvent such as a carbonate, ester, ether, and so forth can be used as the organic solvent. Among the preceding the use is preferred of a carbonate, for example, ethylene carbonate (EC), diethyl carbonate (DEC), dimethyl carbonate (DMC), and ethyl methyl carbonate (EMC). Or, a fluorinated solvent, e.g., a fluorinated carbonate such as monofluoroethylene carbonate (MFEC), difluoroethylene carbonate (DFEC), monofluoromethyl difluoromethyl carbonate (F-DMC), trifluorodimethyl carbonate (TFDMC), and so forth, can be preferably used.

The positive electrode active material (NiMn-system spinel-structured oxide) of the embodiments of the invention has a high durability to decrease an amount of elution of the transition metal elements (typically Mn) from the positive electrode active material even when high-potential charge/discharge is repeated, in which charging is typically performed to a high-potential state for the positive electrode of 4.3 V or higher versus lithium metal. In addition, the use of this positive electrode active material makes it possible to reduce the generation of the gas that can be produced when a lithium secondary battery is used in a high-potential state. As a consequence of the preceding, the use of the positive electrode active material (NiMn-system spinel-structured oxide) according to the embodiments of the invention can provide a highly reliable lithium secondary battery that exhibits excellent cycle characteristics (durability).

Examples of the invention are described in the following, but the invention is not limited to or by these examples.

A precursor according to Comparative Example 1 was obtained by dissolving manganese sulfate and nickel sulfate in water such that a molar ratio of Mn metal elements to Ni metal elements became 1.5:0.5, and by stirring the mixture while adding sodium hydroxide. The precursor according to Comparative Example 1 and lithium carbonate were mixed such that a molar ratio of the total amount of transition metal (Mn and Ni) in the precursor to the amount of Li in the lithium carbonate became 2:1. This mixture was fired for 15 hours at 900° C. in the atmosphere followed by pulverization with a ball mill to obtain $LiMn_{1.5}Ni_{0.5}O_4$ having a spinel crystalline structure and an average particle diameter of 10 μm. The obtained $LiMn_{1.5}Ni_{0.5}O_4$ was used as the positive electrode active material according to Comparative Example 1.

A precursor according to Comparative Example 2 was obtained by dissolving manganese sulfate, nickel sulfate, iron sulfate, and titanium sulfate in water such that a metal-element molar ratio of Mn:Ni:Fe:Ti became 1.45:0.45:0.05:0.05, and by stirring the mixture while adding sodium hydroxide. The precursor according to Comparative Example 2 and lithium carbonate were mixed such that a metal-element molar ratio of the total amount of transition metal (Mn, Ni, Fe, and Ti) in the precursor to the amount of Li in the lithium carbonate became 2:1. This mixture was fired for 15 hours at 900° C. in the atmosphere followed by pulverization with a ball mill to obtain $LiMn_{1.45}Ni_{0.45}Fe_{0.05}Ti_{0.05}O_4$ having a spinel crystalline structure and an average particle diameter of 10 μm. The obtained $LiMn_{1.45}Ni_{0.45}Fe_{0.05}Ti_{0.05}O_4$ was used as the positive electrode active material according to Comparative Example 2.

A precursor according to Comparative Example 3 was obtained by dissolving manganese sulfate and nickel sulfate in water such that a molar ratio of Mn metal elements to Ni metal elements became 1.5:0.5, and by stirring the mixture while adding sodium hydroxide. The precursor according to Comparative Example 3 was mixed with lithium carbonate and lithium fluoride such that a molar ratio of the total amount of transition metal (Mn and Ni) in the precursor to the amount of Li in the lithium carbonate and lithium fluoride became 2:1 and a molar ratio of Li in the lithium carbonate and lithium fluoride to F in the lithium fluoride became 1.0:0.05. This mixture was fired for 15 hours at 900° C. in the atmosphere followed by pulverization with a ball mill to obtain $LiMn_{1.5}Ni_{0.5}O_{3.95}F_{0.05}$ having a spinel crystalline structure and an average particle diameter of 10 μm. The obtained $LiMn_{1.5}Ni_{0.5}O_{3.95}F_{0.05}$ was used as the positive electrode active material according to Comparative Example 3.

A precursor according to Example 1 was obtained by dissolving manganese sulfate, nickel sulfate, iron sulfate, and titanium sulfate in water such that a metal-element molar ratio of Mn:Ni:Fe:Ti became 1.45:0.45:0.05:0.05, and by stirring the mixture while adding sodium hydroxide. The precursor according to Example 1 was mixed with lithium carbonate and lithium fluoride such that a molar ratio of the total amount of transition metal (Mn, Ni, Fe, and Ti) in the precursor to Li in the lithium carbonate and lithium fluoride became 2:1 and a molar ratio of Li in the lithium carbonate and lithium fluoride to F in the lithium fluoride became 1.0:0.05. This mixture was fired for 15 hours at 900° C. in the atmosphere followed by pulverization with a ball mill to obtain $LiMn_{1.45}Ni_{0.45}Fe_{0.05}Ti_{0.05}O_{3.95}F_{0.05}$ having a spinel crystalline structure and an average particle diameter of 10 The obtained $LiMn_{1.45}Ni_{0.45}Fe_{0.05}Ti_{0.05}O_{3.95}F_{3.05}$ was used as the positive electrode active material according to Example 1.

$LiMn_{1.45}Ni_{0.45}Fe_{0.05}Ti_{0.05}O_{3.98}F_{0.02}$ having a spinel crystalline structure was obtained using the same materials and process as in Example 1, but using a blending ratio for the lithium carbonate and lithium fluoride such that a molar ratio of Li in the lithium carbonate and lithium fluoride to F in the lithium fluoride became 1.0:0.02. The obtained $LiMn_{1.45}Ni_{0.45}Fe_{0.05}Ti_{0.05}O_{3.98}F_{0.02}$ was used as the positive electrode active material according to Example 2.

$LiMn_{1.45}Ni_{0.45}Fe_{0.05}Ti_{0.05}O_{3.9}F_{0.1}$ having a spinel crystalline structure was obtained using the same materials and process as in Example 1, but using a blending ratio for the lithium carbonate and lithium fluoride such that a molar ratio of Li in the lithium carbonate and lithium fluoride to F in the lithium fluoride became 1.0:0.1. The obtained $LiMn_{1.45}Ni_{0.45}Fe_{0.05}Ti_{0.05}O_{3.9}F_{0.1}$ was used as the positive electrode active material according to Example 3.

$LiMn_{1.45}Ni_{0.45}Fe_{0.05}Ti_{0.05}O_{3.7}F_{0.3}$ having a spinel crystalline structure was obtained using the same materials and process as in Example 1, but using a blending ratio for the lithium carbonate and lithium fluoride such that a molar ratio of Li in the lithium carbonate and lithium fluoride to F in the lithium fluoride became 1.0:0.3. The obtained $LiMn_{1.45}Ni_{0.45}Fe_{0.05}Ti_{0.05}O_{3.7}F_{0.3}$ was used as the positive electrode active material according to Example 4.

$LiMn_{1.45}Ni_{0.45}Fe_{0.05}Ti_{0.05}O_{3.9995}F_{0.0005}$ having a spinel crystalline structure was obtained using the same materials and process as in Example 1, but using a blending ratio for the lithium carbonate and lithium fluoride such that a molar ratio of Li in the lithium carbonate and lithium fluoride to F in the lithium fluoride became 1.0:0.0005. The obtained $LiMn_{1.45}Ni_{0.45}Fe_{0.05}Ti_{0.05}O_{3.9995}F_{0.0005}$ was used as the positive electrode active material according to Example 5.

$LiMn_{1.45}Ni_{0.45}Fe_{0.05}Ti_{0.05}O_{3.9997}F_{0.0003}$ having a spinel crystalline structure was obtained using the same materials and process as in Example 1, but using a blending ratio for the lithium carbonate and lithium fluoride such that a molar ratio of Li in the lithium carbonate and lithium fluoride to F in the lithium fluoride became 1.0:0.0003. The obtained $LiMn_{1.45}Ni_{0.45}Fe_{0.05}Ti_{0.05}O_{3.9997}F_{0.0003}$ was used as the positive electrode active material according to Example 6.

$LiMn_{1.45}Ni_{0.45}Fe_{0.05}Ti_{0.05}O_{3.92}F_{0.08}$ having a spinel crystalline structure was obtained using the same materials and process as in Example 1, but using a blending ratio for the lithium carbonate and lithium fluoride such that a molar ratio of Li in the lithium carbonate and lithium fluoride to F in the lithium fluoride became 1.0:0.08. The obtained $LiMn_{1.45}Ni_{0.45}Fe_{0.05}Ti_{0.05}O_{3.92}F_{0.08}$ was used as the positive electrode active material according to Example 7.

$LiMn_{1.45}Ni_{0.45}Fe_{0.05}Ti_{0.05}O_{3.8}F_{0.2}$ having a spinel crystalline structure was obtained using the same materials and process as in Example 1, but using a blending ratio for the lithium carbonate and lithium fluoride such that a molar ratio of Li in the lithium carbonate and lithium fluoride to F in the lithium fluoride became 1.0:0.2. The obtained $LiMn_{1.45}Ni_{0.45}Fe_{0.05}Ti_{0.05}O_{3.8}F_{0.2}$ was used as the positive electrode active material according to Example 8.

The molar ratios for the constituent atoms in each of the positive electrode active materials according to Comparative Examples 1 to 3 and Examples 1 to 8 is represented in the "composition (molar ratio) of the positive electrode active material" columns in Table 1.

The composition (molar ratio) of each of the positive electrode active materials prepared as described above according to Comparative Examples 1 to 3 and Examples 1 to 8 were measured by an ordinary ICP emission spectroscopic analysis or absorptiometric method (lanthanum-alizarin complexone method). The composition of each positive electrode active material is given in Table 1.

Lithium secondary batteries according to Comparative Examples 1 to 3 and Examples 1 to 8 were fabricated using, respectively, the positive electrode active materials prepared as described above according to Comparative Examples 1 to 3 and Examples 1 to 8. These lithium secondary batteries according to Comparative Examples 1 to 3 and Examples 1 to 8 were fabricated using the same materials and processes, but using the positive electrode active material according to the particular example. The description that follows uses the fabrication of the lithium secondary battery of Comparative Example 1 as an example.

A slurry (paste) composition for forming a positive electrode active material layer was prepared by mixing the positive electrode active material of Comparative Example 1, acetylene black as a conductive material, and PVdF as a binder in N-methyl-2-pyrrolidone (NMP) such that a mass ratio of these materials became 87:10:3. This composition was coated on a 15 μm-thick aluminum foil (positive electrode current collector). The applied material was dried and pressed to produce a positive electrode sheet in which a positive electrode active material layer was formed on the positive electrode current collector.

A paste composition for forming a negative electrode active material layer was prepared by mixing a natural graphite with an average particle diameter of 20 as the negative electrode active material, SBR as a binder, and CMC as a thickener in water such that a mass ratio of these materials became 98:1:1. This composition was coated on a 15 μm-thick copper foil (negative electrode current collector). The applied material was dried and pressed to produce a negative electrode sheet in which a negative electrode active material layer was formed on the negative electrode current collector.

The thusly produced positive electrode sheet and negative electrode sheet were disposed facing each other (stacked) with a separator sheet (PP/PE composite porous membrane) sandwiched therebetween, and this was housed along with a nonaqueous electrolyte solution in a laminate case (laminate film) to fabricate a lithium secondary battery according to Comparative Example 1. A solution of $LiPF_6$ dissolved at 1 mol/L in a mixed solvent of F-DMC and MFEC in a 1:1 volumetric ratio was used as the nonaqueous electrolyte solution.

Initial charging was carried out on the lithium secondary batteries according to Comparative Examples 1 to 3 and Examples 1 to 8 fabricated as described above. Thus, full charging (state of charge (SOC) approximately 100%) was performed by carrying out constant-current charging to 4.9 V at a current value (charging rate) of C/5 followed by constant-voltage charging to the point that the current value during the constant-voltage charging reached C/50. The discharge capacity (initial capacity) was subsequently measured when constant-current discharge was carried out to 3.5 V at a current value of C/5 at a temperature of 25° C. Here, 1C denotes the current value that can charge the battery capacity (Ah) predicted from the theoretical capacity for the positive electrode in 1 hour.

After this measurement of the initial capacity, each of the lithium secondary batteries of Comparative Examples 1 to 3 and Examples 1 to 8 was submitted to charge/discharge cycle testing in which 200 charge/discharge cycles were repeated, and to measurement of the discharge capacity and amount of gas generation after this testing. First, 200 charge/discharge cycles were repeated in the charge/discharge cycle test where, operating under a temperature condition of 60° C., one charge/discharge cycle consisted of constant-current charging to a voltage of 4.9 V at a 2C charging rate followed by constant-current discharge to a voltage of 3.5 V at a 2C discharge rate. After the completion of this charge/discharge cycle testing, the discharge capacity after the charge/discharge cycle testing (discharge capacity after 200 cycles) was measured on each battery using the same method as for the above-described measurement of the initial capacity. The capacity decline percentage after 200 cycles versus the initial capacity ((initial capacity−discharge capacity after 200 cycles)/initial capacity×100(%)) was calculated. The "capacity decline ratio" column in Table 1 gives the relative ratio (the capacity decline ratio) for the percentage decline in the capacity for each battery using the percentage decline in the capacity of the lithium secondary battery according to Comparative Example 1 as 100 (reference).

Using the lithium secondary batteries according to Comparative Examples 1 to 3 and Examples 1 to 8 fabricated as described above, the volume A [mL] of each battery was measured by the Archimedean method prior to (immediately after assembly of the battery according to the particular example) the execution of the initial capacity measurement (initial charge). The volume B [mL] of each battery was also measured by the Archimedean method using the lithium secondary batteries according to Comparative Examples 1 to 3 and Examples 1 to 8 after the 200-cycle charge/discharge cycle test. The volume A [mL] was subtracted from the volume B [mL] in each case to calculate the amount of gas production (B−A) [mL] after the 200 cycles. The "gas production ratio" column in Table 1 gives the relative ratio (the gas production ratio) for the amount of gas production for the particular battery using the amount of gas production by the lithium secondary battery according to Comparative Example 1 as 100 (reference). The Archimedean method is a method in which the measurement target (the lithium secondary battery in these examples) is immersed in a liquid medium (for example, distilled water or an alcohol; Fluorinert (registered trademark) in these examples) and the volume of the measurement target is determined by measuring the buoyancy acting on the measurement target.

TABLE 1

| | Composition (Molar Ratio) of Positive Electrode Active Material | | | | | | | Capacity Decline Ratio | Gas Production Ratio |
|---|---|---|---|---|---|---|---|---|---|
| | Li | Mn | Ni | Fe | Ti | O | F | | |
| Comparative Example 1 | 1.0 | 1.50 | 0.50 | 0.00 | 0.00 | 4.00 | 0.00 | 100 | 100 |
| Comparative Example 2 | 1.0 | 1.45 | 0.45 | 0.05 | 0.05 | 4.00 | 0.00 | 76 | 89 |
| Comparative Example 3 | 1.0 | 1.50 | 0.50 | 0.00 | 0.00 | 3.95 | 0.05 | 82 | 80 |
| Example 1 | 1.0 | 1.45 | 0.45 | 0.05 | 0.05 | 3.95 | 0.05 | 52 | 54 |
| Example 2 | 1.0 | 1.45 | 0.45 | 0.05 | 0.05 | 3.98 | 0.02 | 61 | 61 |
| Example 3 | 1.0 | 1.45 | 0.45 | 0.05 | 0.05 | 3.90 | 0.10 | 50 | 50 |
| Example 4 | 1.0 | 1.45 | 0.45 | 0.05 | 0.05 | 3.70 | 0.30 | 90 | 90 |
| Example 5 | 1.0 | 1.45 | 0.45 | 0.05 | 0.05 | 3.9995 | 0.00050 | 60 | 60 |
| Example 6 | 1.0 | 1.45 | 0.45 | 0.05 | 0.05 | 3.9997 | 0.00030 | 78 | 86 |
| Example 7 | 1.0 | 1.45 | 0.45 | 0.05 | 0.05 | 3.92 | 0.08 | 50 | 50 |
| Example 8 | 1.0 | 1.45 | 0.45 | 0.05 | 0.05 | 3.8 | 0.20 | 77 | 82 |

As shown above, the lithium secondary battery according to Example 1 is provided with a positive electrode active material that is composed of a lithium transition metal complex oxide (a NiMn-system spinel-structured oxide) that has a spinel crystalline structure and that contains Mn and Ni as its main transition metals, at least Ti and Fe as additive transition metals, oxygen, and fluorine substituted for a portion of the oxygen. As shown in Table 1, it was confirmed that the lithium secondary battery according to Example 1 exhibited a greater inhibition of the capacity decline than the lithium secondary battery according to Comparative Example 1, i.e., it had a greater durability (cycle characteristics).

As shown above, the lithium secondary battery according to Comparative Example 2 is provided with a positive electrode active material that is composed of a NiMn-system spinel-structured oxide that contains Ti and Fe as additive transition metals, but which lacks F. The lithium secondary battery according to Comparative Example 3 is provided with a positive electrode active material composed of a NiMn-system spinel-structured oxide that contains neither Ti or Fe as additive transition metals, but in which a portion of the oxygen constituting this oxide is substituted by F. As shown in Table 1, the lithium secondary batteries according to Comparative Examples 2 and 3 were confirmed to exhibit a greater inhibition of the capacity decline than the lithium secondary battery according to Comparative Example 1. However, the inhibitory effect on the capacity decline was less in Comparative Examples 2 and 3 than for the battery according to Example 1. This result is thought to be due to an inhibition of Mn elution in the state in which charging had been carried out to a high potential (for example, at least 4.3 V versus lithium metal) and thus due to an enhanced stability (durability) for this NiMn-system spinel-structured oxide. The causes of the inhibition of Mn elution are thought to include the following: an increase in the bond force (bond energy) between the transition metal and oxygen in the NiMn-system spinel-structured oxide, which is brought about by the substitution of Ti and Fe for a portion of the Ni and Mn that are the main transition metals constituting the crystalline structure of the NiMn-system spinel-structured oxide; the F substituted for a portion of the oxygen constituting the NiMn-system spinel-structured oxide bonds with the Mn at a high bond strength; and the F compensates for the oxygen deficiency sites that can be produced in a NiMn-system spinel-structured oxide containing Ti and Fe, thus improving the charge balance in the NiMn-system spinel-structured oxide as a whole and increasing the average oxidation state of the Mn (increasing the proportion of 4+).

It was also confirmed that gas generation was more inhibited for the lithium secondary battery according to Example 1 than for the lithium secondary batteries according to Comparative Examples 1 to 3. This is thought to be due to the following: the introduced F compensates for the oxygen deficiency sites that can be produced in a NiMn-system spinel-structured oxide containing Ti and Fe, which brings about a decline in the oxygen deficiency in the NiMn-system spinel-structured oxide which in turn causes a decline in the generation of gas, e.g., $H_2$, that is due to decomposition of the nonaqueous electrolyte (typically an nonaqueous electrolyte solution).

The suitable range for the F content in the NiMn-system spinel-structured oxide is investigated through a comparison of Examples 1 to 8, which have different fluorine contents in the NiMn-system spinel-structured oxide. Using (4−y) for the content of the element oxygen in the NiMn-system spinel-structured oxide, a substantial inhibition of the capacity decline, i.e., a substantial improvement in the durability (cycle characteristics), was confirmed for all the lithium secondary batteries according to Examples 1 to 3, 5 and 7 for which the content ratio (content) y of the element F contained in the NiMn-system spinel-structured oxide satisfied $0.0005 \leq y \leq 0.1$. In addition, the lithium secondary batteries according to Examples 1 to 3, 5 and 7 sufficiently inhibited the gas generation. In addition, when the batteries according to Examples 1 to 3, 5 and 7 were compared, it was confirmed that, when y satisfied $0.0005 \leq y \leq 0.1$, the inhibition of the capacity decline was greater at larger contents of the F in the NiMn-system spinel-structured oxide. In particular, a sufficient inhibition of the capacity decline and the gas generation was confirmed for all the lithium secondary batteries according to Examples 1, 3 and 7 which satisfied $0.05 \leq y \leq 0.1$. Based on the preceding, and using (4−y) for the content of the element oxygen in the NiMn-system spinel-structured oxide, it was confirmed that the content ratio (content) y of the element F contained in the NiMn-system spinel-structured oxide can be $0.0005 \leq y \leq 0.1$ (preferably $0.05 \leq y \leq 0.1$).

Specific examples of the invention have been particularly described above, but these are nothing more than examples. The invention encompasses various alterations and modifications of the specific examples provided above as examples.

The invention claimed is:

1. A positive electrode active material for a lithium secondary battery, the positive electrode active material comprising
a lithium transition metal complex oxide having a spinel crystalline structure, wherein
the lithium transition metal complex oxide includes:
manganese and nickel as main transition metal elements;
titanium and iron as additive transition metal elements; and
oxygen and fluorine,
wherein the lithium transition metal complex oxide is represented by a following general formula (I):

$$Li_xMn_{2-a-b-c-d}Ni_aTi_bFe_cM_dO_{4-y}F_y \quad (I)$$

wherein
M is at least one element selected from the group consisting of Al, Si, Mg, Ca, Ba, Sr, Sc, V, Cr, Co, Cu, Zn, Ga, Y, Ru Rh, Pd, In, Sn, Sb, La, Ce, Sm, Zr, Nb, Ta, Mo, W, B, C, P, and S, $0.9 \leq x \leq 1.3$, $0.0005 \leq y \leq 0.1$, $0.4 \leq a \leq 0.5$, $0 < b \leq 0.2$, $0 < c \leq 0.05$, and $0 \leq d \leq 0.2$.

2. The positive electrode active material according to claim 1, wherein the fluorine of the lithium transition metal complex oxide is fluorine substituted for a portion of the oxygen of the lithium transition metal complex oxide.

3. The positive electrode active material according to claim 1, wherein the general formula (I) satisfies the following conditions:

$0.05 \leq y \leq 0.1$;

$0 < b \leq 0.1$.

4. A positive electrode for a lithium secondary battery, comprising:
a positive electrode current collector; and a positive electrode active material layer disposed on the positive electrode current collector and containing the positive electrode active material according to claim 1.

5. A lithium secondary battery comprising:
a positive electrode including a positive electrode active material layer disposed on a positive electrode current collector;
a negative electrode including a negative electrode active material layer disposed on a negative electrode current collector; and
a nonaqueous electrolyte, wherein
the positive electrode active material layer contains the positive electrode active material according to claim 1.

\* \* \* \* \*